United States Patent Office 3,433,783
Patented Mar. 18, 1969

3,433,783
METHOD FOR THE PRODUCTION OF RIBO-
NUCLEOSIDE-5'-PHOSPHATE
Mikio Honja and Kin-Ichi Imai, Takatsuki, Osaka, Japan, assignors to Takeda Chemical Industries, Ltd., Osaka, Japan
No Drawing. Continuation-in-part of application Ser. No. 635,311, Apr. 25, 1967. This application July 3, 1967, Ser. No. 650,661
U.S. Cl. 260—211.5
Int. Cl. C08b 19/00
9 Claims

ABSTRACT OF THE DISCLOSURE

A method is provided for the production of ribonucleoside-5'-phosphate. In the process, the corresponding ribonucleoside is reacted with metaboric acid and the resultant product is subsequently reacted with a phosphorylating agent.

This application is a continuation-in-part of application Ser. No. 635,311 filed Apr. 25, 1967, which application is in turn a continuation application of application Ser. No. 435,787, filed Feb. 25, 1965, and both now abandoned.

This invention is concerned with a method for the production of ribonucleoside-5'-phosphate, which comprises reacting the ribonucleoside with metaboric acid and thereupon forthwith reacting the product with phosphorylating agent, and subsequently converting the resulting product into ribonucleoside-5'-phosphate by the action of water.

Recently considerable attention has been directed to syntheses of ribonucleoside-5'-phosphates, because the compounds have direct bearing on the biologically important ribonucleic acid and nucleotide coenzymes. In addition, disodium salts of nucleoside-5'-phosphates have been used as condiments in the production of various foods, by virtue of their characteristic flavor enhancing or seasoning qualities.

Ribonucleosides have three hydroxyl groups, i.e. one at each of the 2'-, 3'- and 5'-positions on their ribose moiety, and therefore in order to produce ribonucleoside-5'-phosphate selectively from the corresponding ribonucleoside, it is necessary to protect the hydroxyl groups at the 2'- and 3'-positions with suitable substituents prior to the phosphorylation at the 5'-position.

The hitherto known methods for the production of ribonucleoside-5'-phosphates starting with the corresponding ribonucleosides consists of protecting the 2'- and 3'-hydroxyl groups on the ribose moiety with acyl groups or isopropylidene groups, followed by phosphorylation of the free 5'-hydroxyl group by an appropriate agent and then by removal of the protecting group or groups.

However, the hitherto known methods are bound up with troublesome and disadvantageous steps. That is to say, in addition to a step for the protection of the 2'- and 3'-hydroxyl groups prior to subsequent phosphorylation at the 5'-position, the methods necessarily include a troublesome step for removing the protecting groups from the phosphorylated product. For example, in case the protecting groups are acyl groups, a treatment with methanolic ammonia must be carried out, and in case the protecting group is an isopropylidene group, the isopropylidene group must be removed by heating the phosphorylated product under acidic conditions in a step subsequent to the phosphorylation reaction, and these manipulations are difficult and disadvantageous from the technical point of view.

Although attempts have been made to overcome the foregoing difficulties and disadvantages, none, as far as we are aware, has been entirely successful when carried into practice commercially on an industrial scale.

The invention in its broader aspects contemplates providing a new selective phosphorylation of the 5'-hydroxyl group on the ribose moiety of ribonucleoside.

It is an object of the present invention to provide a novel method for the production of ribonucleoside-5'-phosphates. Another object of the invention is to make it very simple to remove the protecting groups at the 2'- and 3'-positions after the phosphorylation reaction. That is to say, in accordance with the invention, the product resulting from the phosphorylation procedure or the reaction mixture is merely contacted with water to achieve removal of the protecting groups, and therefore the present method for the production of ribonucleoside-5'-phosphates is a preferable one from an industrial point of view, as it does not include such troublesome procedures as the deacylation involved in the method heretofore employed in the art, which is far from satisfactory from an industrial point of view. The result, according to the invention is that ribonucleoside-5'-phosphate can be produced in good yield by simple procedures.

"Ribonucleosides" in the present specification comprise those containing a purine or pyrimidine base, and include the naturally occurring as well as the synthetic ribonucleosides.

Briefly stated, the present invention comprises reacting the starting ribonucleoside with metaboric acid and thereupon forthwith reacting the product with phosphorylating agent, and subsequently converting the resulting product into ribonucleoside-5'-phosphate by the action of water.

The characteristic feature, in carrying the invention into practice, is that metaboric acid is, first of all, reacted with the starting ribonucleoside to selectively protect the hydroxyl groups at the 2'- and 3'-positions on the ribose moiety of the ribonucleoside.

The metaboric acid used in the present invention can either be in free form or in the form of salt such as ammonium salt, sodium salt, etc. The reaction proceeds by heating a mixture of metaboric acid and ribonucleoside in an organic solvent. Any solvent may be used unless the reaction is thereby hindered. Among the solvents which can conveniently be used for the reaction, there are included, for example, alcohols, such as methanol, ethanol and ethylene glycol, ketones such as acetone and methylethyl ketone, ethers such as dioxane and tetrahydrofuran, hydrocarbons such as benzene, toluene and xylene, halogenated hydrocarbons such as carbon tetrachloride, acid amides such as dimethyl amide, esters such as ethyl acetate and butyl acetate, organic bases such as pyridine, phenols such as ortho-, and para-cresol, and mixture thereof. The other conditions, such as reaction temperature and reaction time, are adapted to the particular starting material.

It appears that the compound resulting from the reaction between metaboric acid and ribonucleoside is a borate complex in which metaboric acid forms a complex with the hydroxyl groups at the 2'- and 3'-positions on the ribose moiety.

The next step in the method of the present invention is phosphorylation of the 5'-hydroxyl group on the ribose moiety.

In the method of the present invention, the product need not be separated from the reaction mixture, i.e. the latter can be directly phosphorylated, as such.

For the phosphorylation, any of the known methods are applicable. Among the agents which are preferably used for the present phosphorylation, there are included phosphoryl chlorides such as diphenylphosphoryl chloride and dibenzylphosphoryl chloride, phosphoric acid anhydrides such as O-benzylphosphorus - O,O - diphenylphosphoric acid anhydride and tetra-p-nitrophenyl-pyrophosphoric acid anhydride, pyrophosphoryl mono-, di- or tetrachloride, and the mixture of phosphorus oxychloride and water, etc.

The product resulting from the phosphorylation is subsequently brought into contact with water or an organic solvent containing water. In the method of the present invention, the phosphorylated product need not be separated from the reaction mixture, but the latter can directly be brought into contact with water, or an organic solvent containing water. In this case, it is generally preferable to employ cold water or aqueous alkaline solution. By this procedure, i.e. by the action of the water, the protecting group is removed, that is to say, the metaboric acid is removed from the borate complex, with the result that the protected hydroxyl groups at the 2'- and 3'-position on the ribose moiety are changed back into free hydroxyl groups.

The present method is extremely advantageous from the industrial point of view. In contrast with the hitherto known methods, the present method is characterized by extreme simplicity of procedure for removal of any protecting groups.

The resulting final product, i.e. ribonucleoside-5'-phosphate can be isolated from the reaction mixture by methods per se well known in the art, for example using ion-exchange resins or active carbon, or by crystallizing in a form of salt such as sodium salt, barium salt, potassium salt, amino acid salt, etc.

As detailed above, by the present invention, ribonucleoside-5'-phosphate can be obtained in very simple procedure and under very moderate conditions as compared with those of known methods, and yet the reaction is completed in a short period of time. Moreover, the 5'-phosphate is obtained in high purity and good yield.

For the purpose of giving those skilled in the art a better understanding of the invention, the following illustrative examples of presently preferred embodiments are given. In these examples, percentages are by weight unless otherwise specified.

Example 1

To 300 milliliters of meta-cresol were added 5 grams of adenosine, 1.12 grams of metaboric acid and 72 milliliters of acetone. The mixture was warmed at 40° C. under stirring for one hour to give a solution. After the solution was cooled to 5° C., 40.5 grams of pyrophosphoryl tetrachloride were dropwise added thereto and the mixture was left for 3 hours. The reaction mixture was poured into ice water, and meta-cresol was extracted with ether. The ether layer was washed with water. The washing and the above-obtained ice water layer were combined, and the combined solution was adjusted to pH 1 with normal solution of sodium hydroxide. Paper electrophoresis showed that adenosine-5'-monophosphate was produced in yield of 92%.

Example 2

To a suspension of 133 milligrams of well dried adenosine in 10 milliliters of acetone, were added 22 milligrams of metaboric acid. The mixture was heated at 70° C. for 3 hours and the solvent evaporated under reduced pressure. One milliliter of pyrophosphoryl tetrachloride was added to the residue under ice cooling and the mixture was left standing at 10° C. for 3 hours to give a homogeneous solution, which was poured into ice water. The mixture was adjusted to pH 1 with normal solution of sodium hydroxide and then adsorbed on a charcoal column. The column was washed with water and eluted with 50% aqueous ethanol containing 0.5% by volume of ammonium hydroxide. The eluate was concentrated and examined by paper electrophoresis (0.05 mol borate, pH 9.2). This showed that adenosine-5'-monophosphate was produced in yield of 70%. The concentrate was poured onto a column of Amberlite CG400 (Cl form), which was eluted with 0.003 normal hydrochloric acid. After the obtained eluate was adsorbed on a charcoal column, the column was washed with water and eluted with aforesaid ethanol solution. The eluate was concentrated after the addition of sodium hydroxide and then ethanol was added thereto to give colorless crystals of disodium salt of adenosine-5'-monophosphate.

Example 3

To a solution of 107 milligrams of inosine in 8 milliliters of dimethylformamide, were added 17.6 milligrams of metaboric acid. The mixture was heated at 70° C. for 3 hours and the solvent evaporated under reduced pressure. 0.8 milliliter of pyrophosphoryl tetrachloride was added to the residue under ice cooling and the mixture was left standing at 10° C. for 3 hours to give a homogeneous solution. The solution was treated in the same way as in Example 2. Paper electrophoresis showed that inosine-5'-monophosphate was produced in yield of 55–60%. The solution was applied on top of a column of Amberlite CG400 (Cl form), which was eluted with 0.003 normal hydrochloric acid containing 0.02 molar concentration of sodium chloride. The obtained eluate was treated in the same way as in Example 2 to give colorless crystals of disodium salt of inosine-5'-monophosphate.

Example 4

To 107 milligrams of inosine dissolved in 16 milliliters of acetone, were added 17.6 milligrams of metaboric acid. After the mixture was refluxed for 30 minutes, it was subsequently treated in the same way as in Example 3 to give disodium salt of inosine-5'-monophosphate.

Example 5

A mixture of 113 milligrams of guanosine, 18 milligrams of metaboric acid and 8 milliliters of actone was refluxed for 3 hours and the acetone evaporated under reduced pressure. 0.8 milliliter of pyrophosphoryl tetrachloride was added to the residue under ice cooling and the mixture was left standing at 10° C. for 3 hours to give a homogeneous solution. The solution was poured into 20 milliliters of normal sodium hydroxide solution to adjust to pH 2, and was adsorbed on a charcoal column. The column was washed with water and eluted. The eluate was applied on top of a column of Amberlite CG 400 (Cl form), which was eluted with 0.003 normal hydrochloric acid containing 0.015 molar concentration of sodium chloride. The obtained eluate was treated in the same way as in Example 4 to give colorless crystals of disodium salt of guanosine-5'-monophosphate.

Example 6

A mixture of 97 milligrams of cytidine, 17.6 milligrams of metaboric acid and 8 milliliters of actone was refluxed for 3 hours. The obtained reaction mixture was treated in the same way as in Example 5 and adsorbed on a column of Amberlite CG 400. The column was eluted with 0.002 normal hydrochloric acid. The eluate was treated in the same way as in Example 5 to obtain colorless crystals of disodium salt of cytidine-5'-monophosphate.

Example 7

To 300 milliliters of meta-cresol were added 4.75 grams of inosine and 1.12 grams of metaboric acid. The mixture was warmed at 40° C. under stirring for one hour to give a homogeneous solution. After the solution was cooled to 5° C., 40.5 grams of pyrophosphoryl tetrachloride were dropwise added thereto and the mixture was left for 2 hours. The reaction mixture was poured into ice water and the meta-cresol was extracted with ether. The ether layer was washed with water. The washing and the above obtained water layer were combined, and the combined solution was adjusted to pH 1 with normal sodium hydroxide. Paper electrophoresis (borate buffer, pH 9.2) showed that inosine-5'-monophosphate was produced in yield of 89%. The solution was diluted with water and adsorbed on a charcoal column. The column was washed with water and eluted with 0.7% aqueous solution of sodium hydroxide. After the eluate was adjusted to pH 8.6, it was concentrated and then ethanol added thereto to give crystals of disodium salt of inosine-5'-monophosphate.

Having thus disclosed the invention, what is claimed is:

1. A method for producing ribonucleoside-5'-phosphate from the corresponding ribonucleoside, which comprises reacting the ribonucleoside with metaboric acid, whereby the metaboric acid selectively adds on at the 2'- and 3'-positions on the ribose moiety with formation of borate complex and resultant protection of the hydroxyl group at these positions, and thereupon forthwith subjecting said borate complex to the action of pyrophosphoryl tetrachloride as phosphorylating agent, whereby phosphorylation takes place at the 5'-position, and subsequently bringing the resulting phosphorylated product into contact with water to re-constitute the 2'- and 3'-hydroxy groups.

2. The method as claimed in claim 1, wherein the ribonucleoside is inosine.

3. The method as claimed in claim 1, wherein the ribonucleoside is quanosine.

4. The method as claimed in claim 1, wherein the ribonucleoside is adenosine.

5. The method as claimed in claim 1, wherein the ribonucleoside is cytidine.

6. The method as claimed in claim 1, wherein the ribonucleoside is uridine.

7. The method as claimed in claim 1, wherein the metaboric acid is in the form of ammonium salt thereof.

8. The method as claimed in claim 1, wherein the metaboric acid is in the form of alkali metal salt thereof.

9. In a method for producing ribonucleoside-5'-phosphate from the corresponding ribonucleoside by phosphorylation preceded by protection of the 2'- and 3'-OH groups of the ribonucleoside, the improvement according to which the protecting agent is a member selected from the group consisting of metaboric acid and ammonium and alkali metal salts thereof.

References Cited

UNITED STATES PATENTS

| 3,067,192 | 12/1962 | Emrick | 260—234 |
| 3,201,389 | 8/1965 | Fujimoto et al. | 260—211.5 |
| 3,231,561 | 1/1966 | Brunelle et al. | 260—234 |

LEWIS GOTTS, *Primary Examiner.*

J. R. BROWN, *Assistant Examiner.*